United States Patent
Popp et al.

(10) Patent No.: US 7,291,250 B1
(45) Date of Patent: Nov. 6, 2007

(54) VACUUM DISTILLATION SYSTEM AND USE THEREOF FOR CONCENTRATING ORGANIC-AQUEOUS SOLVENT MIXTURES

(75) Inventors: Michael A. Popp, Lauf (DE); Heinz Walter Joseph, Berg (DE); Michael R. Rannow, Lennestadt (DE)

(73) Assignee: Bionorica AG, Neumarkt (DE)

( * ) Notice: Subject to any disclaimer, the term of this patent is extended or adjusted under 35 U.S.C. 154(b) by 0 days.

(21) Appl. No.: 09/806,423

(22) PCT Filed: Oct. 20, 1999

(86) PCT No.: PCT/EP99/07968

§ 371 (c)(1),
(2), (4) Date: Mar. 30, 2001

(87) PCT Pub. No.: WO00/24488

PCT Pub. Date: May 4, 2000

(51) Int. Cl.
*B01D 3/06* (2006.01)
*B01D 3/10* (2006.01)

(52) U.S. Cl. ............... 203/19; 159/2.1; 159/44; 159/47.1; 159/901; 159/DIG. 16; 159/DIG. 40; 202/182; 202/186; 202/202; 202/205; 202/176; 203/3; 203/87; 203/88; 203/94; 203/98

(58) Field of Classification Search ........ 202/205, 202/182, 176, 186, 202; 203/1, 3, 18, 91, 203/87, 19, 94, 98, 88; 159/2.1, 47.1, 44, 159/901, DIG. 16, DIG. 40
See application file for complete search history.

(56) References Cited

U.S. PATENT DOCUMENTS

| | | | | |
|---|---|---|---|---|
| 2,613,177 A | * | 10/1952 | Worthen et al. | ............ 202/174 |
| 4,305,790 A | | 12/1981 | Kramer, Sr. | |
| 4,345,976 A | * | 8/1982 | Peter et al. | ............ 203/49 |
| 4,347,321 A | * | 8/1982 | Lionelle et al. | ............ 435/161 |
| 4,428,799 A | * | 1/1984 | Standiford | ............ 203/19 |
| 4,528,162 A | * | 7/1985 | Goodwin et al. | ............ 422/101 |
| 4,600,477 A | * | 7/1986 | Higashi et al. | ............ 203/26 |
| 5,382,321 A | * | 1/1995 | Fagerlind et al. | ............ 159/47.3 |
| 5,922,174 A | * | 7/1999 | Youngner | ............ 202/186 |

(Continued)

FOREIGN PATENT DOCUMENTS

DE    41 29 076 A1    3/1993

(Continued)

OTHER PUBLICATIONS

International Search Report dated Oct. 20, 1999; application No. PCT/EP99/07968.

(Continued)

*Primary Examiner*—Virginia Manoharan
(74) *Attorney, Agent, or Firm*—RatnerPrestia

(57) ABSTRACT

The present invention relates to a vacuum distillation plant and a process for concentrating organic aqueous solutions, especially spissum extracts, using said plant. The vacuum distillation plant of the invention comprises a flash evaporator, a means for vapor concentration and a multi-stage condenser positioned down-stream of said means for vapor concentration, means for recycling at least part of the condensate from a condensation stage into the bottoms product being provided. In addition, the present invention relates to a process for concentrating organic aqueous solutions such as concentrated extracts using said plant.

37 Claims, 1 Drawing Sheet

U.S. PATENT DOCUMENTS 6,685,802 B1 * 2/2004 Nazzer ..................... 203/1

FOREIGN PATENT DOCUMENTS

| | | |
|---|---|---|
| DE | 295 04 345.8 U1 | 6/1995 |
| EP | 0 600 203 A1 | 6/1994 |
| EP | 0 812 233 B1 | 12/1997 |
| FR | 2 435 521 | 4/1980 |
| GB | 1 600 942 | * 10/1981 |
| WO | WO93/24198 | 12/1993 |
| WO | WO97/20606 | 6/1997 |

OTHER PUBLICATIONS

Reinhard Billet; "Industrielle Destillation", Verlag Chemie GmbH, 1973, pp. 250-256.

* cited by examiner

VACUUM DISTILLATION SYSTEM AND USE THEREOF FOR CONCENTRATING ORGANIC-AQUEOUS SOLVENT MIXTURES

BACKGROUND OF THE INVENTION

The present invention relates to a vacuum distillation plant and a process for concentrating organic aqueous solvent mixtures, especially spissum extracts, using said plant.

One route for preparing drugs on plant basis is extracting the plant material and processing the extracts and tinctures obtained into dry extracts. As a rule, aqueous, alcoholic or mixed aqueous/alcoholic extracts are prepared, ethanol generally being used as the alcoholic component. However, the extracts may contain additional organic solvents such as methanol, propanol, butanols as well as ethers and ketones (especially ethyl ether and acetone). The extracts or tinctures thus obtained are used as such or concentrated to so-called spissum extracts which may then be processed into dry extracts. Concentration of organic aqueous solvent mixtures is generally conducted by bubble or surface evaporation. As a result of contact with hot surfaces, undesirable conversions may occur which may lead to a decrease of the content of active ingredients. Since the more volatile component of the solvent mixture is evaporated first using a distillation method of the prior art, the water level increases. This water level is primarily responsible for germ growth. The pertinent pharmacopoeias define the bacterial counts for bacteria, yeasts and molds.

When selecting a non-sterile starting product, which is unavoidable in the production of plant extracts, the bacterial count in the finished end product is directly related to the processing time.

DE 195 25 026.5 provides a process for drying spissum by using a multi-blade stirrer which reduces the drying time considerably without being harmful, but this process encounters problems of capacity. In order to avoid having to use this process for spissum preparation, concentration under similarly inoffensive conditions that would not harm the product would be necessary. Such an industrial or commercial scale process is not known.

Thickening or vaporizing is generally conducted by conventional distillation. However, conventional distillation has various disadvantages when used to thicken or vaporize spissum extracts or general aqueous alcoholic solutions. For a start, a considerable amount of energy is required to vaporize highly polar solutions such as water or alcohol. For example, about 1 KW of energy is needed to evaporate 1 kg of water in conventional evaporator systems, which is 15 times the amount required to distill polar solvents such as toluene. As far as the apparatus is concerned, large surface areas in the heat exchangers and continuous introduction of heat are required. Consequently, processes without heat recovery are highly unprofitable.

Since the more volatile solvent is first distilled off from solvent mixtures, operators are also facing the problem that the ratio of the solvents in the bottoms product changes continuously. However, in case of plant extracts, reduction of the alcohol content, which constitutes the more volatile component in aqueous alcoholic solvent mixtures, results in undesirable precipitation of extracted materials. In extreme cases, this means that first the alcohol and then, in a second run, the water is distilled off in a batch process in order to achieve concentration of the bottoms product. However, this results in segregation of the product.

As mentioned above, conventional distillation processes also requires the continuous addition of heat. This conflicts with the high temperature sensitivity of most active ingredients derived from plants which are usually protected by applying a vacuum during distillation. Even though this permits a decrease of the operating temperature of the distillation process, heat still needs to be introduced which results in a considerable strain on the interfaces in the bottoms product to be concentrated.

Finally, vaporising of aqueous alcoholic plant extracts also creates the problem of foam formation in some plants. In order to avoid the formation of foam, the surface tension of the bottoms product must be reduced by adding alcohol. Distilling off the alcohol increases the problem of foam formation. In extreme cases, such foam formation causes flooding of the distillation apparatus so that the process needs to be interrupted and production stopped.

In order to solve the problem of high energy consumption, attempts have been made to use different distillation processes including heat recovery employed in other technical fields. Among those processes, an open heat pump with mechanical concentration appears to be the most economical. For example, 50 Watts/kg are required for distilling water which corresponds to an energy consumption 20 times lower than in conventional distillation. Specifically, the distillation plant based on the principle of an open heat pump, which is known from the prior art, operates with mechanical concentration of the vaporized product (concentration of the overhead product). The overhead released under vacuum in the evaporator is volumetrically withdrawn from the concentration means, concentrated with additional heating and then precipitated in a condenser. The energy of condensation is channeled directly to the evaporation process. This results in an energy saving process which is kept going by the concentration means alone without heating or cooling, permitting a considerable reduction of the amount of heat required.

Depending on the solution to be distilled, the plant may be operated with a bubble evaporator or a flash evaporator. When a bubble evaporator is used, the heat exchanger is located in the bottoms space of the medium to be distilled, while, in a flash evaporator, a circulating pump transports the bottoms product through the heat exchanger and recycles it to the evaporator in a heated state, where it is expanded for distillation. Such plants are used to concentrate baths and rinses from degreasing, phosphatisation, chromatisation and galvanization, for cooling lubricant emulsions, vibratory grinding emulsions, compressor condensates or washing solutions from washing cabins and high-pressure cleaning devices. The distillate (waste water) may be fed into the regular sewer, while a highly concentrated concentrate, which needs to be disposed of, is recovered as the bottoms product. In the case of solvent mixtures, however, this type of distillation process is still encumbered by the problem that the more volatile solvent is distilled off first with the result that the ratio of the solvents in the bottoms product shifts. Therefore, plants of the prior art are not suitable either for concentrating aqueous alcoholic solutions such as plant extracts.

SUMMARY OF THE INVENTION

The present invention provides a plant and a process for concentrating organic aqueous solutions, especially plant extracts or spissum extracts while avoiding the problems listed above. Preferably, this concentration should take place under the least harmful conditions for the ingredients and, optionally, permit adjustment of the degree of concentration and the alcohol content of the solution as required.

Figure 1:
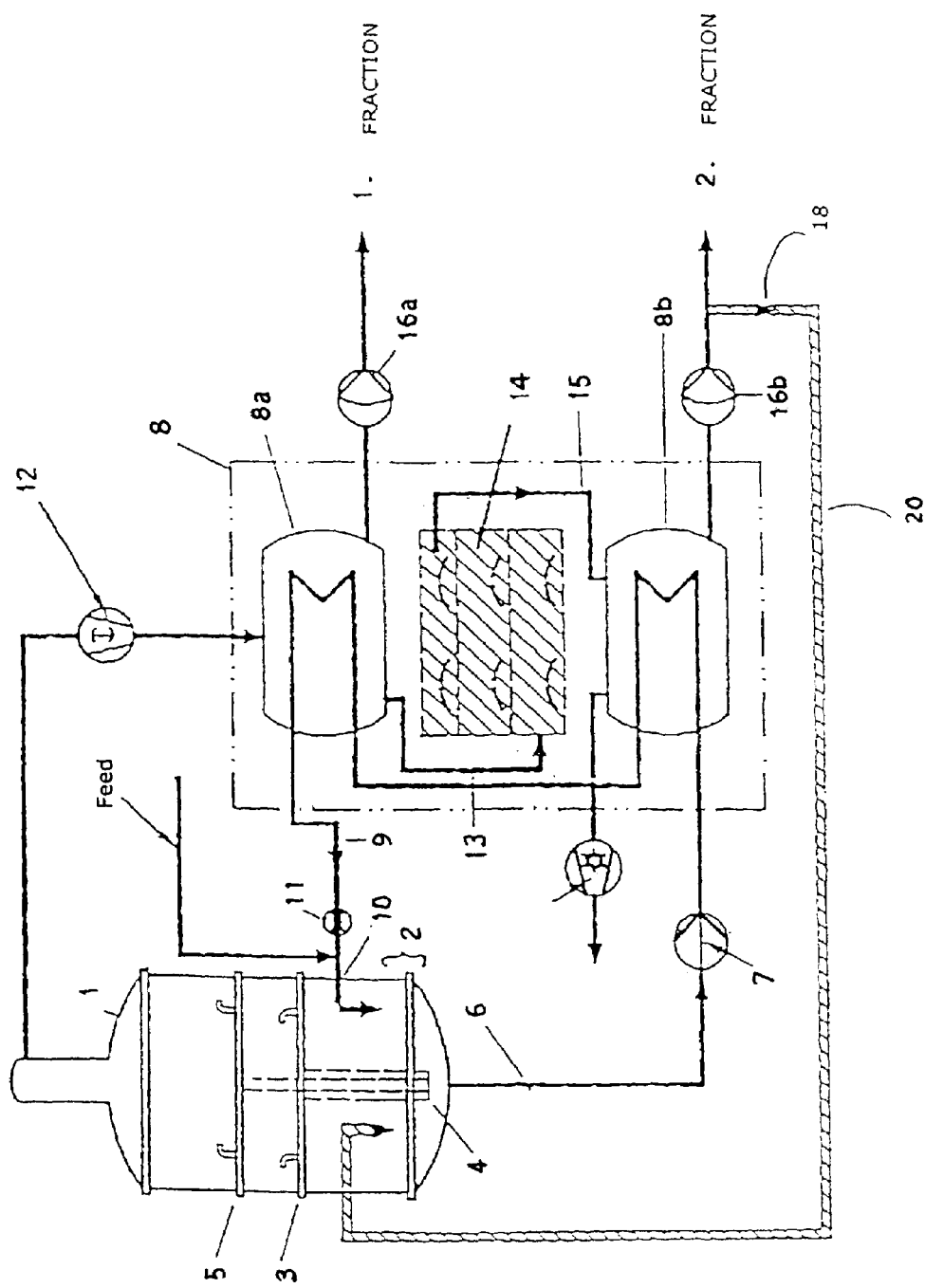
FIG. 1 is a schematic representation of a distillation apparatus according to the present invention.

According to the invention, there is provided a vacuum distillation plant, comprising a) a flash evaporator, b) a vapor concentration means, and c) a multi-stage condenser positioned downstream of the vapor concentration means preferably with interposed rectification, including means for recycling at least part of the condensate from a condensation stage to the bottoms product.

Preferably, the condenser serves as a heat exchanger and is arranged in such a manner that the bottoms product serves as a cooling liquid or heat carrier liquid for the condenser, respectively, before recycling to the evaporator or injection into the flash evaporator. This is effected by directing the bottoms product past the condenser as a cooling liquid before feeding it into the evaporator. By heat exchange, the bottoms product takes up the condensation heat of the distillate and is thus brought back to the distillation temperature. Upon being fed into the flash evaporator once more, the bottoms product expands, part of the solvents evaporates and the remaining liquid is cooled. This liquid, in turn, becomes the bottoms product which may be reused for cooling. Transport of the "cooling liquid" takes place in accordance with the principle of heat exchange, i.e. the liquid is first contacted with the colder condensation stage for the most volatile components of the overhead product, followed by additional condensation stages in the order of volatility of the distillate components ending with the condensation stage for the least volatile components. In case of aqueous alcoholic solvent mixtures water is the least volatile component and the alcohol(s) is/are the most volatile component(s) of the overhead product. The distillate condensates are removed separately from the condensation stages.

Preferably, a rectification is provided between the condensation stages in order to achieve an improved separation of the overhead product components from each other. Preferably, two to four, most preferably two condensation stages are provided, depending on the number of components of the solvent mixtures to be removed.

In accordance with the invention, at least part of the condensate of at least one stage is recycled to the bottoms product by lines provided for that purpose before being channeled to evaporation once more. By adding part of the condensate to the bottoms product, it is possible to replace the amount of the more volatile component in the bottoms product which has been removed overproportionately and to keep the ratio of the solvents constant despite different volatilities. According to the invention, alcohol as the more volatile component serves to entrain the less volatile component water, which is entrained from the aqueous alcoholic solvent mixture below the azeotrope point. It is preferred to feed the condensate back into the evaporator above the liquid level of the bottoms product. Likewise, the condensate may be fed into the bottoms product, mixed with the bottoms product and, optionally, additional solution (spissum extract), and the mixture introduced into the evaporator.

The efficiency of the cooling process may be enhanced by providing a means for actively directing the bottoms product or the bottoms from the evaporator through the condenser. Preferably, this means is a circulating pump.

The device according to the invention preferably has the features described in the claims.

The invention also provides a process for inoffensive concentration of aqueous alcoholic solutions wherein a) the solution is expanded under vacuum;

b) the overhead product is transported volumetrically and concentrated;

c) the overhead product is condensed in several stages for separation into its less volatile and more volatile components; and d) at least part of the condensate of at least one stage is recycled to the bottoms product before said bottoms product is reused in step a) until the desired concentration has been reached.

Preferably, the bottoms product is used as the cooling liquid for the condensation stages by being actively directed past the different condensation stages as described above.

Preferably, a process for the inoffensive concentration of binary aqueous alcoholic (preferably ethanolic) solutions is provided wherein step c) comprises two condensation steps and the condensate of the second stage, which is the more volatile alcohol, especially ethanol, is recycled to the bottoms product. The condensate is preferably recycled in such an amount that the water/alcohol ratio (water/ethanol ratio) of the solution in the bottoms product remains constant.

Evaporation takes place with the aid of flash evaporation. Flash evaporation permits operation at low temperatures while reducing the strain on the surface areas of the product, shortening residence times and ensuring homogenous energy up-take at the same time. This avoids thermal strain on the active drug components of the plant extracts. Generally, this permits concentrating solutions containing heat-sensitive substances.

According to the invention, the process is preferably used to concentrate aqueous ethanolic plant drug extracts having an ethanol content of at least 20 vol.-%, preferably 30 to 70 vol.-%. In this range, most active drug ingredients, especially phenols and flavonoids of plant origin, are soluble. In the invention, it is possible to avoid taking the extract too far into the water phase so that segregation of the spissum extract does not occur.

The plant of the invention may be used to carry out the process of the invention.

The invention is based on the idea of using alcohol recovered from the process without additional energy as the entrainer to distill off the water which, per se, is less volatile. On the other hand, the temperature in the heat exchanger is controlled by partial condensation in such a manner that simultaneous condensation and separation of several different solvents (water and alcohol(s)) is possible at the same pressure.

On the one hand, this is achieved by volumetric vapor transportation. In volumetric vapor transportation, the molecules in the gaseous phase are sucked from a (vapor) concentration means in accordance with the composition or the partial pressures of the components in the reaction space. If, as provided by the invention, a concentration means or a volumetric transport system such as a Roots blower is interposed between the evaporation process and the condenser, a defined mixture is formed behind the concentration means which may be decomposed by partial condensation.

As opposed to the prior art, rectification in the invention is not used on the evaporator side, where the reflux necessary for degradation is formed by external heat release and thus a loss of energy, but on the condensate side after concentration. In the invention, condensation (and rectification) are used in such a manner that not just hydraulic energy is used to segregate the vapor pressures, but that it is inherit to the system to also use also the heat of condensation of the condensed fractions to bring the bottoms product up to operating temperature again. In addition, continuous alcohol reflux may be employed as an entrainer without having to use energy over and above the concentration step.

In addition, the fact that part of the condensate is recycled to the evaporator or the bottoms product, respectively, and the heat contained therein is therefore used to heat the bottoms product cooled by the expansion in the flash evaporator has a positive influence on the energy balance. Therefore, recycling the condensate not only permits use of the more volatile component of the solvent as an entrainer for higher boiling components, but also contributes to decrease the energy needed for the overall process. In addition, heat supplied by recycling part of the condensate reduces the strain on the interface of the bottoms product, since it is not necessary to supply external heat via the interface between the container and the bottoms product, because it is introduced together with a liquid. This results in an inoffensive work-up or concentration, respectively. By maintaining the alcohol concentration in the bottoms product, segregation is prevented at the same time.

Using the more volatile solvent (alcohol) as the entrainer or recycling it into the bottoms product and maintaining the alcohol concentration therein also solves the problem of foaming, because this occurs increasingly as the alcohol content in the solvent mixture decreases.

In addition, the separation of the overhead into its individual components as provided by the invention permits recycling the components separately. In accordance with the invention, the overhead is therefore separated by partial condensation in several condensation steps. To facilitate separation, a rectification may be interposed between the individual condensation steps. In the device according to the invention, said rectification is preferably interposed between two heat exchangers so that the necessary weight of the vapor may be developed to condense the higher boiling components (water) separately from the lower boiling components (alcohol). This effect may preferably be increased by using a pre-vacuum pump in addition to the concentration means which may be an oil-driven liquid-ring pump. Unless recycled according to the invention, the individual condensates may be recovered in a comparatively pure form.

A preferred embodiment of the present invention will be described below in connection with the attached drawing.

For a start, a distillation plant as shown in FIG. 1 comprises an evaporation unit 1 placed over an evaporator bottom 2 and, in the region where the liquid to be evaporated circulates, a liquid separator 3 where product entrained in the evaporation step is separated and returned or recycled to the liquid phase via a siphon 4. The distillation plant includes an aerosol separator 5 where the pre-purified vaporization or overhead product(s) in the evaporation unit are purified once more by means of an aerosol (tangential) separator 5 in order to remove the aerosols contained therein.

A sensing probe (not shown) is disposed centrally at the bottom of the evaporator 1 by which the level of the contents in the evaporator may be measured. The bottoms product cooled by evaporation is fed to pump 7 via discharge pipe 6. In order to avoid formation of a vortex or clogging by deposited product, the discharge pipe is a curved part so that the evaporator cannot be emptied completely via pipe 6. For complete emptying an additional pipe is provided in the lowest part (portion) of the evaporator bottom 2 which insures that the remainder is fed into pump 7. Pump 7 is preferably a circulating pump used to transport the bottoms from evaporator 1 through a heat exchanger 8, comprising two stages and a rectification unit in conjunction with the two stages, where it is heated and recycled to a tangential injection means 10 in evaporator 1 by line 9. Additional solution (feed) may be supplied by the same line. Addition of feed takes place by use of a charging valve 11 in line 9 with the inlet of the feed into line 9 preferably designed in such a way that it also acts as a throttle by means of which the circulating product is expanded so that the feed is mixed with the circulating bottoms product in line 9 prior to entering the evaporator 1.

Vapors or overhead products released during evaporation are withdrawn from the vapor concentration means 12, which is preferably a Roots vacuum pump or Roots Blower, concentrated and pushed (introduced or conducted) into the first stage 8a of heat exchanger 8 at the same time. Thus concentration means 12 serves to concentrate the overhead vapors by compression to ensure volumetric transport of the overhead to the heat exchanger 8. In the bottoms region of heat exchanger section 8a a line 13 leads from heat exchanger section 8a to the rectification stage or unit 14 of heat exchanger 8 so that vapors not condensed in the heat exchanger stage 8a rise through the rectification unit 14 and are then transported through line 15 from the rectification unit 14 into the second heat exchanger stage 8b where preferably all of the remaining solution is precipitated (condensed). Pump 22 and conduit 24 are included in the second stage 8b of heat exchanger 8 to enable the user to vent any un-condensed vapors from the second stage 8b of heat exchanger 8. In each case, the condensate from the heat exchanger stages is preferably withdrawn by membrane pumps 16a, 16b and discharged. Depending on the throughput adjustment, the condensate from the second heat exchanger stage 8b is returned to the head space of the evaporator 1 by means of a valve 18 and conduit 20 so as to ensure the proper reflux ratio.

In the process of the invention the spissum extract to be concentrated is fed into the evaporator, relaxed and the evolving gases removed by the concentration means. The distillation residue or the bottoms product, respectively, drops into the bottom space and is directed past the heat exchangers as the cooling liquid. Since new extract is continuously supplied through the line and concentrated extract may be removed via the bottom line, the process may be conducted continuously. Optionally, a batch process may be employed. In both cases, the alcohol content of the bottoms product may be adjusted continuously by the amount of the recycled alcohol. The operating temperature of the process is between 35 and 45° C., preferably between 38 and 42° C. The vacuum to be applied is between 80 and 150 mbar, preferably between 110 and 130 mbar. Condensate which has not been recycled may be removed and reused for extraction or disposed of as a product with negligible contamination.

As a result, a vaporisation ratio of 1:10 may be achieved with the process according to the invention. The absolute amount of active drug ingredients contained in the extract is not reduced; there is no or extremely little precipitation or foam formation.

The invention claimed is:

1. A vacuum distillation plant for concentrating a solution, comprising:
   a) an evaporator for producing an overhead product and a bottoms product;
   b) vapor concentration means downstream of said evaporator to receive said overhead product;
   c) a multi-stage condenser downstream of said vapor concentration means to condense at least a portion of said overhead product into a liquid condensate;

d) rectification means between said condenser stages; and e) means for maintaining a substantially constant ratio of more volatile to less volatile constituents in the solution undergoing concentration, said means for maintaining the ratio comprising a recycling line connected between the multi-stage condenser and a pump installed in said recycling line for recycling at least part of said condensate from the condenser to said bottoms product of said evaporator.

2. A vacuum distillation plant according to claim 1 wherein two to four condensation stages are provided with a rectification interposed between each of said condensation stages.

3. A vacuum distillation plant according to claim 2, wherein all or part of the condensate of the last condensation stage is recycled to the evaporator.

4. A vacuum distillation plant according to claim 2, wherein the condensate is recycled to the evaporator above the liquid level of the bottoms product.

5. A vacuum distillation plant according to claim 2, wherein the condensate is introduced into and mixed with the bottoms product and the mixture is introduced into the evaporator.

6. A vacuum distillation plant according to claim 1, wherein said pump is a membrane pump.

7. A vacuum distillation plant according to claim 6, wherein the condensate is fed into the evaporator above the liquid level of the bottoms product.

8. A vacuum distillation plant according to claim 6, wherein the condensate is introduced into and mixed with the bottoms product and the mixture is introduced into the evaporator.

9. A vacuum distillation plant according to claim 6 comprising two condensation stages.

10. A vacuum distillation plant according to claim 9, wherein the condensate is recycled into the evaporator above the liquid level of the bottoms product.

11. A vacuum distillation plant according to claim 9, wherein the condensate is introduced into and mixed with the bottoms product and the mixture is introduced into the evaporator.

12. A vacuum distillation plant according to claim 1 wherein the condensate is recycled into the evaporator above the liquid level of the bottoms product.

13. A vacuum distillation plant according to claim 12, wherein the condensate is introduced into and mixed with the bottoms product and the mixture is introduced into the evaporator.

14. A vacuum distillation plant according to claim 1 wherein the condensate is introduced into and mixed with the bottoms product and the mixture is introduced into the evaporator.

15. A vacuum distillation plant according to claim 1, additionally comprising means for actively directing the bottoms product through the condenser.

16. A vacuum distillation plant according to claim 15 wherein the means for actively directing the bottoms product is a circulating pump.

17. A vacuum distillation plant according to claim 1 comprising a pre-vacuum pump in addition to the concentration means.

18. A vacuum distillation plant according to claim 17, wherein the pre-vacuum pump is an oil-driven liquid-ring pump.

19. A vacuum distillation plant according to claim 1, comprising means on the condensate side for depositing solid and/or liquid components entrained in the overhead product.

20. A vacuum distillation plant according to claim 1 comprising a discharge pipe for conveying the bottoms product from the evaporator to the multi-stage condenser where the bottoms product acts as a heat carrier that absorbs heat, said plant further comprising a circulation line for recycling the bottoms product from the multi-stage condenser back into the evaporator.

21. A process for concentration of an aqueous alcoholic solution comprising the steps of:
   a) placing said solution under vacuum in an evaporator to form an overhead product and a bottoms product;
   b) pressurizing and transporting said overhead product to a multi-stage condenser having rectification means between the condenser stages;
   c) condensing at least a portion of said overhead product by rectification in said multi-stage condenser into a liquid condensate; and
   d) recycling at least part of said liquid condensate to said bottoms product of said evaporator to maintain a substantially constant ratio of more volatile to less volatile constituents in the solution in the evaporator.

22. A process according to claim 21, wherein two condensation steps are carried out in step c) starting from binary solutions and wherein at least part of the condensate of the second step is recycled to the bottoms product.

23. A process according to claim 22, wherein the condensate is recycled in such an amount that the water to alcohol ratio of the solution in the bottoms product remains constant.

24. A process according to claim 22, wherein the bottoms product is distilled by flash evaporation.

25. A process according to claim 22, including the steps of concentrating aqueous ethanolic plant drug extracts having an ethanol content of at least 20 vol. %.

26. A process according to claim 21, wherein the condensate is recycled in an amount so that the water to alcohol ratio of the solution in the bottoms product remains constant.

27. A process according to claim 26, wherein the bottoms product is distilled by flash evaporation.

28. A process according to claim 26, including the steps of concentrating aqueous ethanolic plant drug extracts having an ethanol content of at least 20 vol. %.

29. A process according to claim 21 including the steps of concentrating aqueous ethanolic plant drug extracts having an ethanol content of at least 20 vol. %.

30. A process according to claim 21, wherein two condensation steps are carried out in step c) starting from binary solutions and wherein at least part of the condensate of the second stage is recycled to the bottoms product.

31. A process according to claim 21, wherein the condensate is recycled in such an amount that the water to alcohol ratio of the solution in the bottoms product remains constant.

32. A process according to claim 21, including the steps of concentrating aqueous ethanolic plant drug extracts having an ethanol content of at least 20 vol. %.

33. A process according to claim 21, including the steps of concentrating aqueous ethanolic plant drug extracts having an ethanol content of at least 20 vol. %.

34. A process according to claim 21, including the step of concentrating aqueous ethanolic plant drug extracts having an ethanol content of from 30 to 70 vol. %.

35. A process according to claim 21 comprising the step of conveying the bottoms product from the evaporator to the multi-stage condenser where the bottoms product acts as a heat carrier that absorbs heat.

36. A process for concentrating a plant extract in the form of an aqueous alcoholic solution comprising the steps of:
   a) placing the solution under vacuum in an evaporator to form an overhead product and a bottoms product being a concentrated plant extract;
   b) pressurizing and transporting said overhead product to a multi-stage condenser having rectification means between the condenser stages;
   c) condensing at least a portion of said overhead product by rectification in said multi-stage condenser into a liquid condensate; and
   d) recycling at least part of said liquid condensate to said bottoms product of said evaporator to maintain a substantially constant ratio of more volatile to less volatile constituents in the solution in the evaporator.

37. A process according to claim 36 comprising the step of conveying the bottoms product from the evaporator to the multi-stage condenser where the bottoms product acts as a heat carrier that absorbs heat.

* * * * *